United States Patent Office 3,794,689
Patented Feb. 26, 1974

3,794,689
NOVEL DIETHYNYLCARBINOLS AND ETHERS
Robert D. Dillard, Zionsville, Ind., assignor to Eli Lilly and Company, Indianapolis, Ind.
No Drawing. Continuation-in-part of application Ser. No. 19,078, Mar. 12, 1970, which is a continuation-in-part of application Ser. No. 827,899, May 26, 1969, now abandoned. This application May 17, 1972, Ser. No. 254,261
Int. Cl. C07c 33/06
U.S. Cl. 260—618 E        8 Claims

ABSTRACT OF THE DISCLOSURE

Diethynylbenzyl alcohols and ethers useful as soil fungicides and seed-treatment agents.

CROSS-REFERENCE

This application is a continuation-in-part of my copending application, Ser. No. 19,078, filed Mar. 12, 1970, which was in turn a continuation-in-part of my then copending application, Ser. No. 827,899, filed May 26, 1969, both now abandoned.

BACKGROUND OF THE INVENTION

Fungi which occur in the soil can have a deleterious effect on growing and germinating plants. In many instances, the germination of seeds planted in soil infected with fungi is prevented entirely because of fungal attack; and, even where germination occurs, the resulting seedlings often do not develop into healthy plants. Organisms affecting plants in this latter manner are known as seedling blight or damping-off fungi. An example is *Rhizoctonia solani*. Another fungus, *Phytophthora cinnamomi*, severely affect the roots of a large number of plants including avocado, pine, pineapple, heather, camellia, rhododendron, cinchona, chestnut, peach, yew, a number of deciduous and coniferous nursery trees, and Lawson cypress. *Fusarium oxysporum* f. *tracheiphilum* affects the vascular system of cowpeas, which are utilized for hay, soil improvement, and food in the Southeastern part of the United States causing the plants to wilt and die. Sclerotium root rot (*Sclerotium rolfsii*) is a coarse, rapidly growing mycelium which adversely attacks many vegetable crops and sugar beets.

The fungi can be inhibited either by treatment of the soil where the seeds are to be planted or, in some instances, by direct treatment of the seeds themselves.

SUMMARY

The compounds provided by this invention are novel $\alpha,\alpha$-diethynyl benzyl alcohols and ethers of the formula

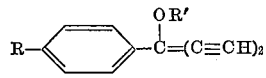

wherein R is hydrogen, $C_1$–$C_4$ alkyl, $C_1$–$C_3$ alkoxy, halo, phenyl, or halo-$C_1$–$C_3$ alkyl, and R′ is hydrogen, $C_1$–$C_3$ alkyl, $C_1$–$C_3$ alkyloxymethyl, or $C_1$–$C_3$ alkyloxyethyl with the proviso that only one of R and R′ can be hydrogen in a given molecule.

"$C_1$–$C_3$ alkyl" as used in this specification represents methyl, ethyl, n-propyl, or isopropyl; "$C_1$–$C_4$ alkyl" represents the above groups plus n-butyl, isobutyl, sec-butyl or t-butyl; "halo" represents chloro, bromo, fluor, or iodo; and "$C_1$–$C_3$ alkoxy" refers to the above $C_1$–$C_3$ alkyl groups attached at any available position through an intervening oxygen atom, including, illustratively, methoxy, ethoxy, n-propoxy, or isopropoxy.

Compounds coming within the scope of the above formula useful in the fungicidal processes of this invention include:

$\alpha,\alpha$-Diethynyl-4-fluorobenzyl ethoxymethyl ether
$\alpha,\alpha$-Diethynyl-4-iodobenzyl alcohol
$\alpha,\alpha$-Diethynyl-4-chlorobenzyl n-propoxy ether
$\alpha,\alpha$-Diethynyl-4-ethoxybenzyl alcohol
$\alpha,\alpha$-Diethynyl-4-chloromethylbenzyl alcohol
$\alpha,\alpha$-Diethynyl-4-isopropylbenzyl isopropoxymethyl ether
$\alpha,\alpha$-Diethynyl-4-n-propoxybenzyl alcohol
$\alpha,\alpha$-Diethynyl-4-methoxybenzyl methyl ether
$\alpha,\alpha$-Diethynyl-4-pentafluoroethylbenzyl alcohol
$\alpha,\alpha$-Diethynyl-4-heptafluoro-n-propylbenzyl alcohol
$\alpha,\alpha$-Diethynyl-4-heptafluoroisopropylbenzyl alcohol
$\alpha,\alpha$-Diethynyl-4-bromomethylbenzyl alcohol
$\alpha,\alpha$-Diethynyl-4-ethylbenzyl alcohol
$\alpha,\alpha$-Diethynyl-4-methylbenzyl methoxyethyl ether
$\alpha,\alpha$-Diethynyl-4-n-propylbenzyl alcohol
$\alpha,\alpha$-Diethynyl-4-trichloromethylbenzyl alcohol
$\alpha,\alpha$-Diethynyl-4-chlorodifluoromethylbenzyl alcohol
$\alpha,\alpha$-Diethynyl-4-bromobenzyl ethyl ether
$\alpha,\alpha$-Diethynyl-4-trifluoromethylbenzyl alcohol
$\alpha,\alpha$-Diethynyl-4-phenylbenzyl alcohol.

In employing the diethynyl benzyl alcohols and ethers of the above general formula as fungicides, either the fungicidal compound itself or compositions containing the compound plus inert diluents can be applied broadcast to the soil surface to control the fungi therein. The fungicidal compound can be applied at the time of, or prior to, planting a particular crop. The compounds are applied at a rate of at least 0.5 lb. of active compound/acre.

For use as seed treatment chemicals, a compound according to the above formula is dissolved in a suitable solvent, preferably a halogenated alkane such as methylene chloride, and then applied to the seeds by adding the fungicide-containing solution to the seeds to be treated in a tumbler and tumbling these seeds so as to mix the solution and seeds thoroughly. Customarily, a dye is added to the fungicidal solution so that it can be determined readily by visual inspection that the fungicidal solution has been applied uniformly to the entire mass of seeds. The fungicides are applied at the rate of 50–500 gms. per hundred pounds of seed.

$\alpha,\alpha$-Diethynylbenzyl alcohol, previously described by Noltes and Van der Kerk, Rec. trav. Chim., 81, 41–8 (1972), possesses little or no antifungal activity and is phytotoxic when applied pre-emergently; i.e., prior to, or at the time of, planting the crop.

DETAILED DESCRIPTION

The substituted aryldiethynylcarbinols of this invention can be prepared by the method of Noltes and Van der Kerk, loc. cit. which comprises reacting ethynylmagnesium bromide with ethynylphenylketone in tetrahydrofuran. The carbinols can also be prepared by treating the phenyl ester of an appropriately substituted benzoic acid with sodium acetylide in the presence of acetylene and liquid ammonia as fully exemplified in the description which follows. Ethers of the above carbinols are readily prepared by heating the carbinol with a suitable alcohol in the presence of a Lewis acid catalyst.

The soil fungicidal properties of the substituted aryldiethynylcarbinols and ethers of the present invention are evaluated by testing them in soil against *Phytophthora cinnamomi, Fusarium oxysporum, Verticillium alboatrum, Pythium ultimum* or *Rhizoctonia solani* according to the following procedure:

Ordinary greenhouse soil is washed with water, sterilized for 12 hours at 400° F., and then placed in small disposable containers.

Thirty milligrams of test compound are weighed out and placed in a clean, dry, 7-ounce jar. The test compound is dissolved in 0.5 ml. of ethyl alcohol and the volume is brought up to 4 ml. with 0.1 percent polyoxyethylene sorbitan mono-laurate solution. The resulting solution is sprayed upon the soil with a modified DeVilbiss atomizer attached to a 10 p.s.i.g. air source until the equivalent of 40 pounds per acre of test ingredient is attained.

Each container is then inoculated with the test organism by seeding with about 8–12 fungus-infested medium red clover seeds. The seeds are mixed into the top layer of soil with a spatula and the jar is placed in an incubator room kept at 78° F. for five days.

At the end of five days, the jars are examined and the fungicidal activity of each compound is recorded in terms of the plant disease rating at one or more applications rates of the compound under test against the particular plant disease. The following rating scale is employed: 0—severe disease indistinguishable from the untreated control; 1—moderately severe disease; 2—moderate disease; 3—slight disease; and 4—no disease.

The following results were obtained at a 40 lb./acre application rate: $\alpha,\alpha$-diethynyl-4-chlorobenzyl alcohol, *P. cinnamomi*, 3, *R. solani*, 4; $\alpha,\alpha$-diethynyl-4-methylbenzyl alcohol, *P. cinnamomi*, 2, *R. solani*, 1; $\alpha,\alpha$-diethynyl-4-methoxybenzyl alcohol, *P. cinnamomi*, 2, *R. solani*; $\alpha,\alpha$-diethynyl-4-bromobenzyl alcohol, *Pythium ultimum*, 4, *R. solani*, 4; $\alpha,\alpha$-diethynyl-4-iodobenzyl alcohol, *F. oxysporum* 3; $\alpha,\alpha$-diethynyl-4-phenylbenzyl alcohol, *F. oxysporum*, 2; $\alpha,\alpha$-diethynyl-4-trifluoromethylbenzyl alcohol, *F. oxysporum*, 3, *R. solani*, 2, *Pythium ultimum*, 4, $\alpha,\alpha$-diethynylbenzyl methyl ether, *R. solani*, 2.

$\alpha,\alpha$-Diethynyl-benzyl alcohol had a zero rating (inactive) against *P. cinnamomi, R. solani, F. oxysporum,* and *Pythium ultimum* infestations in plants and in addition was phytotoxic at the 40 lb./acre application rate.

In more extended testing, two compounds coming within the scope of the above formula were subjected to a slightly different soil fungicide test at application rates of 40, 20, 10 and 5 pounds per acre. The test was carried out as follows: 2.5 inch plastic pots were filled with a mixture containing 9.5 parts of screened, sterile soil and 0.5 part of soil artificially infested with Pythium species. One hundred gram portions of this mixture were mixed with the test chemical and then transferred to the pot, each pot containing a different amount of the test chemical. The chemicals were added by dissolving them in an acetone-alcohol solvent mixture and diluting with tap water to attain the desired concentration. Each pot was planted with 12 treated, machine-delinted cotton seeds (Stoneville 213). The pots were subirrigated, placed in the greenhouse and covered with polyethylene film until the seedlings had emerged. The uninoculated control was replicated three while the inoculated check was replicated six times. Table I which follows gives the results of this experiment. In the table, column 1 gives the name of the compound, column 2 the application rate in pounds per acre and columns 3 and 4 the disease index observed at 14 and 21 days after planting the seeds. The disease rating scale employed is the same as that used previously.

TABLE I

| Name | Application rate in, pounds/acre | Disease rating at— 14 days | 21 days |
|---|---|---|---|
| $\alpha,\alpha$-Diethynyl-4-trifluoromethyl-benzyl alcohol | 40 | 4 | 4 |
|  | 20 | 4 | 4 |
|  | 10 | 4 | 4 |
|  | 5 | 0 | 0 |
| $\alpha,\alpha$-Diethynyl-4-bromobenzyl alcohol | 40 | 3 | 3 |
|  | 20 | 4 | 4 |
|  | 10 | 3 | 3 |
|  | 5 | 4 | 4 |

Following the general procedure of the above test, determinations were made of the antifungal activity of compounds coming within the scope of the above formula again against Pythium species plus three other organisms—those responsible for fusarium root rot, verticillium wilt and rhizoctonia damping off. In each of the procedures, 150 gms. of fungus-infested sand was placed in a jar. Three gms. of celatom granules impregnated with 4 ml. of the test solution were thoroughly mixed with the sand. Portions of the treated-infested soil were transferred to 2.5 inch plastic pots. Those pots containing Fusarium-infested soil were planted with 4 bean seeds, variety Bountiful, and covered with the remaining sand mixture (a depth of about ¾ inch). The Pythium-infested sand was planted with 12 cotton seeds (Stoneville 213). The Rhizoctonia-infested sand was planted to 12 cucumber seeds (variety Green Prolific). The test for control of verticillium wilt employed 150 gms. of a 50/50 sand-soil mixture which had previously been sterilized. The soil was mixed with granules carrying the test solution as before. Each pot was then planted with four 14–21 day oil cotton seedlings previously inoculated with the fungus by dipping the root system in a conidial suspension of the fungus for about 5 minutes. All pots were subirrigated with 30 ml. of tap water with exception of the verticillium pots. Table II which follows gives the results of these tests. In the table, columns 1 and 2 give the substituents for R and R'; and columns 3, 4, 5 and 6, the test results against the organism listed at the head of the column. All these were run at an application rate of 40 pounds of chemical per acre.

TABLE II

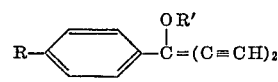

| R | R' | Against fusarium root rot | Against pythium damping off | Against rhizoctonia damping off | Against verticillium wilt |
|---|---|---|---|---|---|
| Iodo | H | 3.0 | 2.6 | 0 | 0 |
| Bromo | H | 2.3 | 3.0 | 0 | .6 |
| Trifluoromethyl | H | 1.6 | 1.6 | .3 | 1 |
| Phenyl | H | 2.3 | 1 | 0 | 0 |
| Chloro | H | 2.6 | 0 | 0 | .6 |
| Methoxy [1] | H | 1.6 | 0 | 0 | .3 |
| Methyl | H | 2.3 | 0 | 0 | 0 |

[1] Test at 20 lbs./acre.

$\alpha,\alpha$-Diethynyl-4-chlorobenzyl methyl ether was tested against *R. Solani* using cotton seedlings but otherwise following the above procedure with the following results.

Table III

| Application rate-lbs./acre: | Disease rating |
|---|---|
| 40 | 4 |
| 20 | 3 |
| 10 | 2 |
| 5 | 2 |

Testing of compounds provided by this invention as seed treatment chemicals is carried out as follows: a mixture containing 13 g. of cotton seed (Stoneville) and 7 g. of beans (Bountiful) were placed in a tumbler. About 155 mg. of $\alpha,\alpha$-diethynyl-4-chlorobenzyl methyl ether were dissolved in 7 ml. of methylene chloride containing 500 p.p.m. of Rhodamine B, a dye. Aliquots of the above solution were diluted to 4 ml. with additional methylene chloride so as to give final concentrations of 50, 100, and 200 g. of compound per hundredweight of seed. 4 ml. aliquots of dilutions containing verying amounts of fungicide were then each added to a 20 g. seed mixture. The seeds in the tumbler were sprayed with the methylene chloride solution using a DeVilbiss atomizer. The seeds were dried with a stream of air after the spraying had been completed. The bean seeds were planted in a *Fusarium solani* infested soil in flats with three replications for each dosage level and the cotton seeds were planted in either a *Pythium aphanidermatum* or a *Rhizoctonia solani* infested soil in flats. The flats were placed in a room with a high controlled humidity for 72 hours; then removed to the greenhouse where they were kept 14 days and then rated for disease, using the same rating scale as given above. $\alpha,\alpha$-Diethynyl-4-chlorobenzylmethyl ether gave a rating of 2.0 against *Pythium aphanidermatum* and 1.3 against *Rhizoctonia solani* at the 200 g./cwt. dosage level. In another trial, the compound showed no affect against *Pythium aphanidermatum* but rated 3.0 at the 300 g./cwt. level, 2.3 at the 200 g./cwt. level and 1.3 at the 100 g./cwt. level against *Rhizoctonia solani*. Again, in another trial against *Rhizoctonia solani*, the same compound gave a 4.0 rating at 500, 300, and 200 g./cwt. The compound also gave a rating of 2.3 against fusarium root rot (*Fusarium solani*) when seeds were planted in soil infested with this organism. Likewise the same compound gave a rating of 3.3 at the 500 g./cwt. level, 1.6 at the 300 g./cwt. level and 1.3 at the 200 g./cwt. level against *Pythium aphanidermatum*.

The unexpected failure of the compounds of this invention to kill germinating plants as compared to the herbicidal activity of the unsubstituted compound of the prior art, $\alpha,\alpha$-diethynylbenzyl alcohol, is demonstrated by the following experimental procedure: a soil is prepared consisting of one part masonry and one part of shredded top soil blended together in a cement mixer. One gallon of this soil is placed in a 25 x 35 cm. galvanized flat and is patted down with a bench brush until level. A three-row template is placed on the soil, and the indicated amounts of each of the following seeds are planted, one species to each section: tomato, 7–10 seeds; rough pigweed, 30–50 mg.; and large crabgrass, 350–400 mg. Sufficient soil is added to cover the entire flat.

The flat prepared as above, is placed in a chamber equipped with a turntable and an air exhaust. The test composition in the form of a spray-type emulsion or a wettable powder is applied to the flat with a modified DeVilbiss atomizer attached to an air source. Twelve and one-half ml. of an aqueous suspension of the mixture containing the compound to be tested in the appropriate composition are applied to each flat either on the day of planting or the succeeding day. Plant injury ratings and observations as to type of injury are made in either case eleven to twelve days after treatment. The injury rating scale used is as follows:

0—no injury
1—slight injury
2—moderate injury
3—severe injury
4—death

When more than one determination is carried out, an average value is calculated for the injury rating.

Table IV sets forth the results of pre-emergent testing of several diethynyl carbinols and one ether coming within the scope of the above formula; $\alpha,\alpha$-diethynylbenzyl alcohol is also included for purposes of comparison. In the table, Column 1, gives the name of the compound; Column 2, the rate in terms of pounds per acre at which the compound was applied to the test flat; and Columns 3 through 5, the injury rating for the particular plant seeds or seedlings.

TABLE IV.—PRE-EMERGENT HERBICIDE ACTIVITY

| Name | Rate, lbs./A. | Tomato | Pigweed | Crabgrass |
|---|---|---|---|---|
| $\alpha,\alpha$-Diethynyl-4-chlorobenzyl alcohol | 15 | 0 | 0 | 0 |
| $\alpha,\alpha$-Deithynyl-4-methylbenzyl alcohol | 15 | 0 | 0 | 0 |
| $\alpha,\alpha$-Deithynyl-4-methoxybenzyl alcohol | 15 | 0 | 0 | 0 |
| $\alpha,\alpha$-Diethynyl-4-bromobenzyl alcohol | 15 | 0 | 0 | 0 |
| $\alpha,\alpha$-Diethynyl-4-iodobenzyl alcohol | 15 | 1 | 1 | 1 |
| $\alpha,\alpha$-Diethynyl-4-trifluoromethylbanzyl alcohol | 15 | 0 | 0 | 1 |
| $\alpha,\alpha$-Diethynyl-4-phenylbenzyl alcohol | 15 | 0 | 1 | 1 |
| $\alpha,\alpha$-Diethynylbenzyl methyl ether | 8 | | 0 | 0 |
| $\alpha,\alpha$-Diethynylbenzyl alcohol | 15 | 4 | 3 | 4 |

Further herbicidal testing of compounds according to the above formula wherein R is halo, methyl, methoxy, trifluoromethyl, or phenyl showed no pre-emergence activity at ½, 1, 2, or 4 lbs./acre against 4 species of weeds and 3 crops and only minimal activity post-emergence at 2 or 4 lbs./acre against pigweed, foxtail, corn, or soybeans.

The following examples will serve to further illustrate the general procedure for the preparation of the compounds of the invention, but are not meant to limit its scope in any manner.

EXAMPLE I

A stirred solution of 65.8 g. (0.7 M.) of phenol in 390 ml. of pyridine was treated dropwise with 100 g. (0.65 M.) of 4-methylbenzoyl chloride. The exothermic reaction which ensued was controlled by external cooling with a salt water-ice bath. After the addition was complete, the mixture was stirred for an additional 30 minutes at ice bath temperature and was then allowed to warm to room temperature during an additional 2 hours. Methylene chloride was added as a solvent and the resulting mixture was washed sequentially with water, dilute hydrochloric acid, dilute sodium hydroxide, and water. The organic layer was separated with dried with anhydrous magnesium sulfate, the solvents were removed in vacuo and the resulting product, phenyl 4-methylbenzoate, was crystallized. It was recrystallized from methylcyclohexane. Yield, 103.3 g. (75%).

A liquid ammonia solution of sodium acetylide was prepared by adding 46 g. of sodium to an excess of acetylene gas in liquid ammonia. The phenyl 4-methylbenzoate prepared above was dissolved in a minimum amount of methylene chloride and added dropwise to the sodium acetylide solution. The mixture was stirred for 2 hours, after which time 2 l. of ether were added and the ammonia was allowed to evaporate. After the reaction mixture had attained room temperature, small chunks of ice were added slowly until the vigorous action caused by their addition had ceased; then 1.5 l. of water were added. The organic layer was separated and washed 3 times with water, dried with anhydrous magnesium sulfate, and the solvent was removed. The resulting liquid was distilled, B.P. 70–73° C. at 0.03 mm. Hg. The product, $\alpha,\alpha$-diethynyl-4-methybenzyl alcohol, weighed 12.2 g. (15%).

*Analysis.*—Calcd. for $C_{12}H_{10}O$ (precent): C, 84.68; H, 5.92. Found (percent): C, 84.37; H, 6.11.

Additional compounds which are prepared by the above method include:

$\alpha,\alpha$-diethynyl-4-chlorobenzyl alcohol, B.P.=85–88° C. at 0.08 mm. Hg.
$\alpha,\alpha$-diethynyl-4-methoxybenzyl alcohol, B.P.=111–114° C. at 0.08 mm. Hg.
$\alpha,\alpha$-diethynyl-4-bromobenzyl alcohol, M.P.=45–47° C.
$\alpha,\alpha$-diethynyl-4-iodobenzyl alcohol, M.P.=61–63° C.
$\alpha,\alpha$-diethynyl-4-trifluoromethylbenzyl alcohol, M.P.=31–33° C.

α,α-diethynyl-4-phenylbenzyl alcohol, M.P.=94–96° C.

EXAMPLE II

A solution of 32 g. of α,α-diethynyl-4-chlorobenzyl alcohol in 750 ml. of methanol was placed in a 3-liter found-bottom flask. A solution prepared by pouring 75 ml. of 98% sulfuric acid over 225 g. of ice and then adding 150 ml. of methanol was added dropwise and with stirring to the solution of the diethynyl alcohol in methanol. The reaction mixture was stirred for six days at room temperature. The reaction mixture was then diluted with water and extracted with 1000 ml. of ether. The ether extract was washed twice with 300 ml. of water, separated and then dried. The solvent was removed by evaporation in vacuo. The residue, comprising α,α-diethynyl-4-chlorobenzyl methyl ether, was purified by distillation, boiling in the range 76–80° C./0.1 mm. Hg; yield=18.9 g.

*Analysis.*—Calcd. (percent): C, 70.43; H, 4.43. Found (percent): C, 70.29; H, 4.61.

Other compounds prepared by the procedure of this example include α,α-diethynylbenzyl methyl ether, α,α-diethynylbenzyl ethyl ether and α,α-diethynyl-2-methylbenzyl methyl ether.

I claim:
1. A compound of the formula

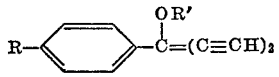

wherein R is hydrogen, $C_1$–$C_4$ alkyl, $C_1$–$C_3$ alkoxy, halo, phenyl, or halo-$C_1$–$C_3$ alkyl, and R' is hydrogen.
2. The compound of claim 1 wherein R is bromo.
3. The compound of claim 1 wherein R is trifluoromethyl.
4. The compound of claim 1 wherein R is phenyl.
5. The compound of claim 1 wherein R is iodo.
6. The compound of claim 1 wherein R is chloro.
7. The compound of claim 1 wherein R is methyl.
8. The compound of claim 1 wherein R is methoxy.

References Cited

UNITED STATES PATENTS

| | | | |
|---|---|---|---|
| 3,535,386 | 12/1970 | Dillard | 260—617 E |
| 3,496,240 | 2/1970 | Sturzenegger | 260—618 X |
| 3,320,122 | 5/1967 | Lemin | 260—617 E X |

OTHER REFERENCES

Thompson et al., "J. Am. Chem. Soc.," vol. 64, pp. 573–6 (1942).

Dillard et al., "J. Med. Chem.," vol. II, pp. 1155–6 (1968).

BERNARD HELFIN, Primary Examiner

D. B. SPRINGER, Assistant Examiner

U.S. Cl. X.R.

260—611 A, 613 D, 618 D; 424—339, 341, 343; 71—3

PO-1050
(5/69)

UNITED STATES PATENT OFFICE
CERTIFICATE OF CORRECTION

Patent No. 3,794,689  Dated February 26, 1974

Inventor(s) Robert D. Dillard

It is certified that error appears in the above-identified patent and that said Letters Patent are hereby corrected as shown below:

Column 1, line 36, "affect" should read --affects--.

Column 2, line 2, "fluor ," should read --fluoro,--.

Column 2, line 13, "α.,α-" should read --α,α--.

Column 3, line 58, "part" should read --parts--.

Column 3, line 69, the word "times" has been deleted between "three" and "while".

Column 4, line 31, "oil" should read --old--.

Column 6, line 14, "banzyl" should read --benzyl--.

Column 6, line 43, the first "with" should read --and--.

Signed and sealed this 17th day of September 1974.

(SEAL)
Attest:

McCOY M. GIBSON JR.
Attesting Officer

C. MARSHALL DANN
Commissioner of Patents